Figure 1:
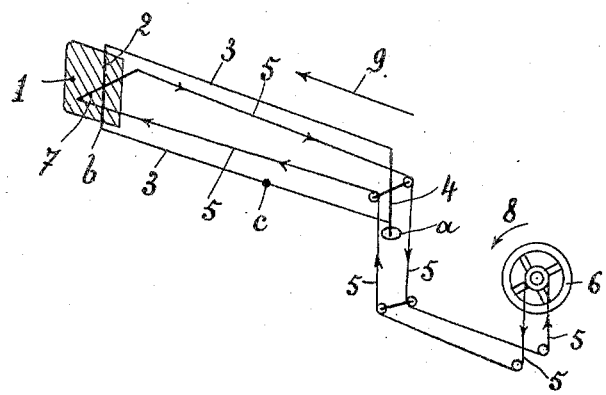

J. A. LATHAM.
CONTROLLING DEVICE FOR AIRSHIPS.
APPLICATION FILED NOV. 13, 1919.

1,366,917.

Patented Feb. 1, 1921.

INVENTOR:
Jean Alfred Latham
By Attys
Fraser, Dunk & Myers

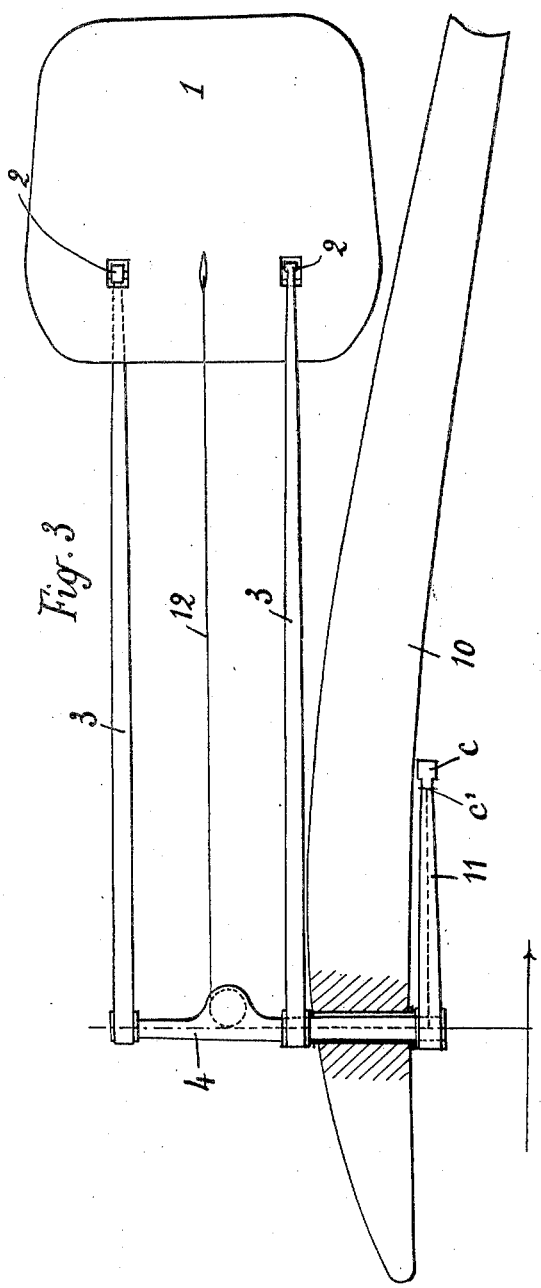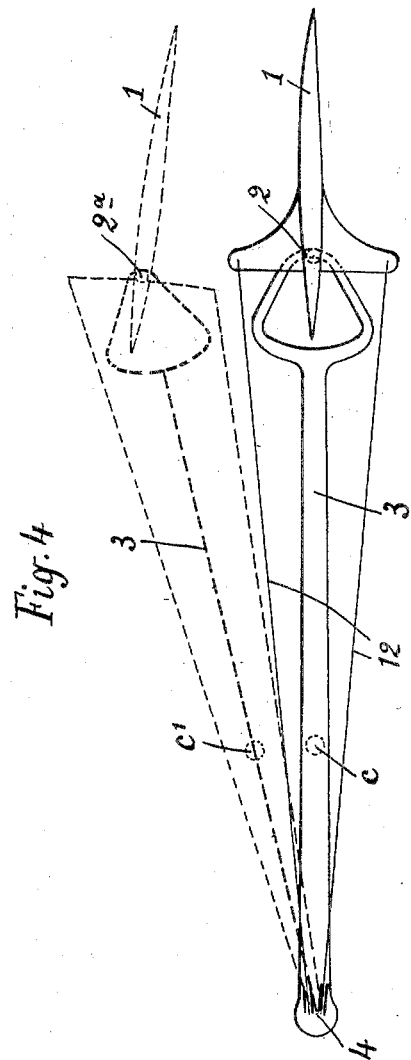

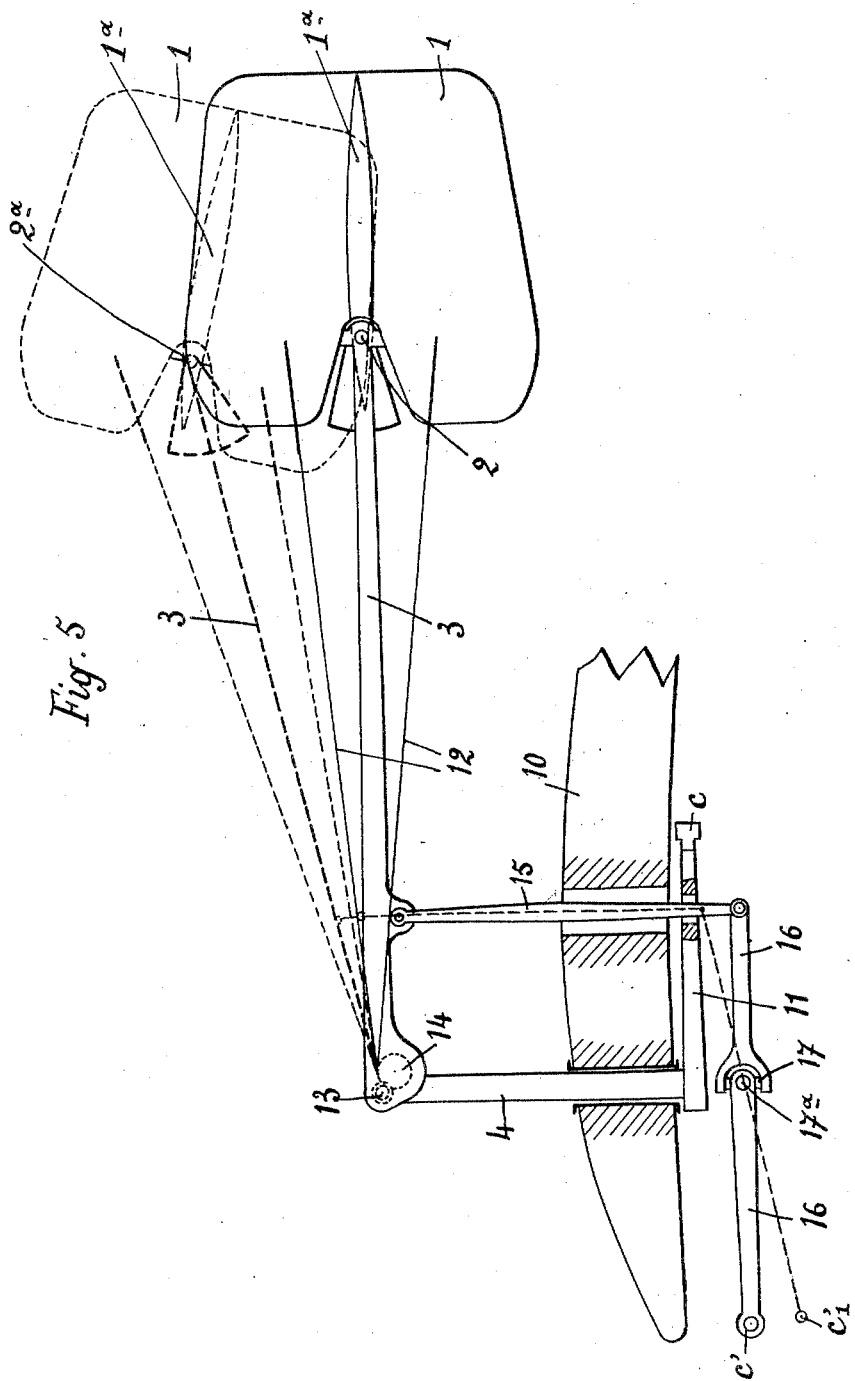

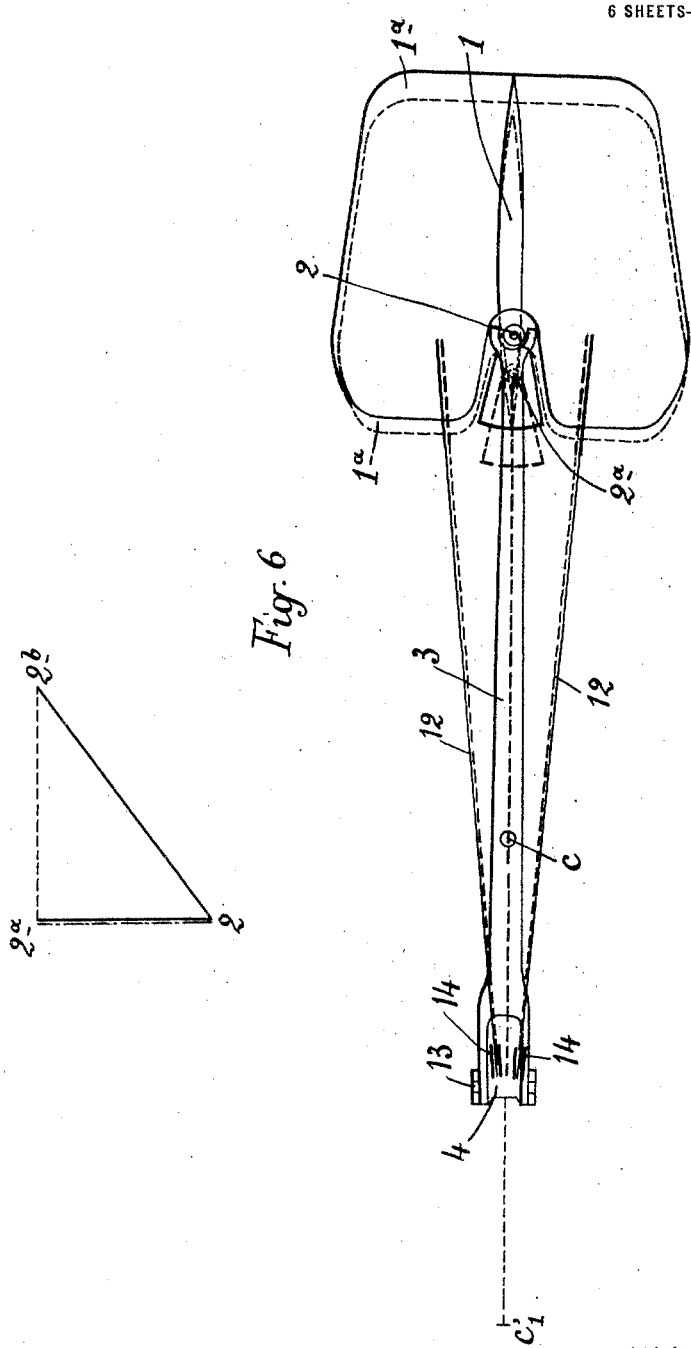

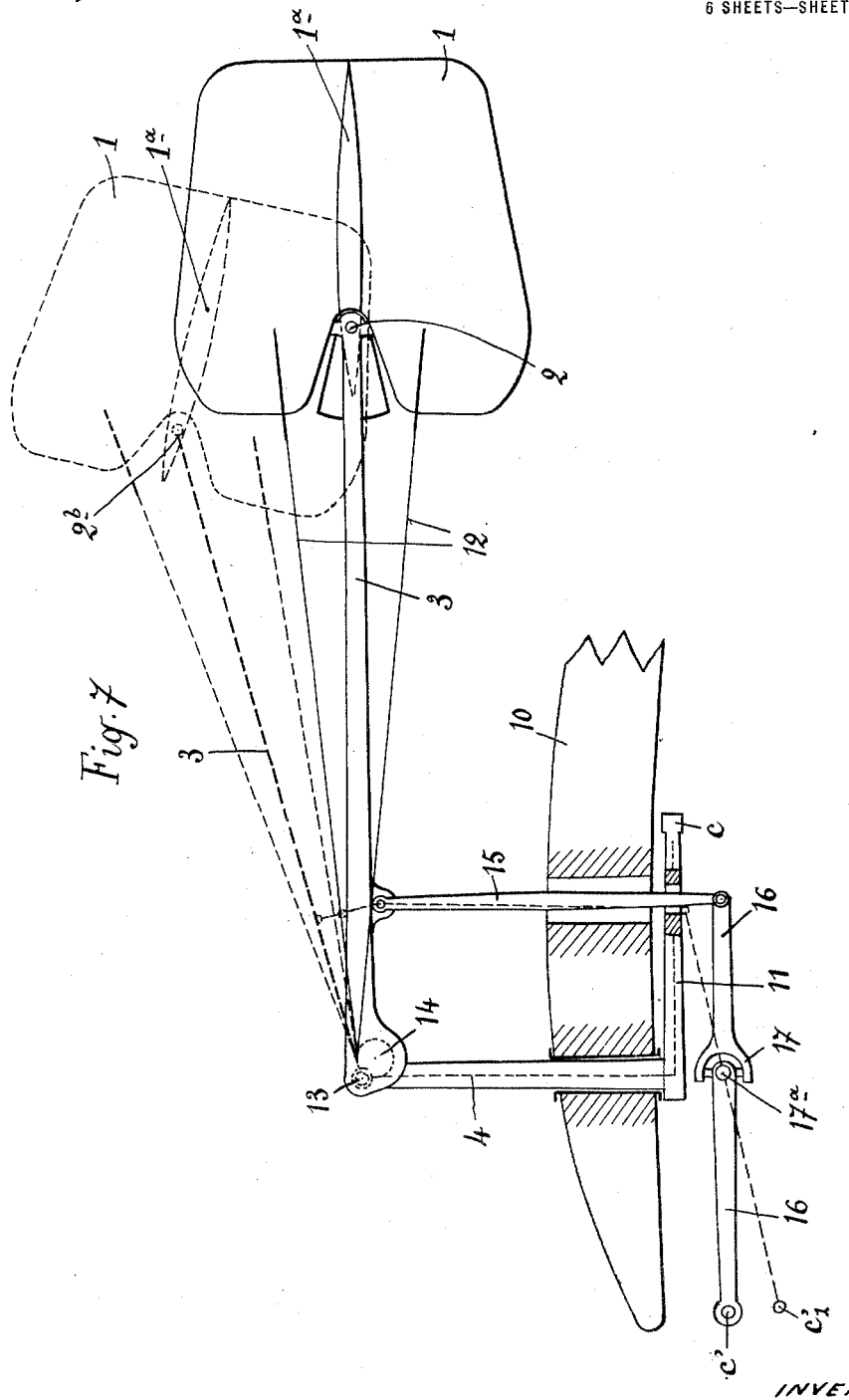

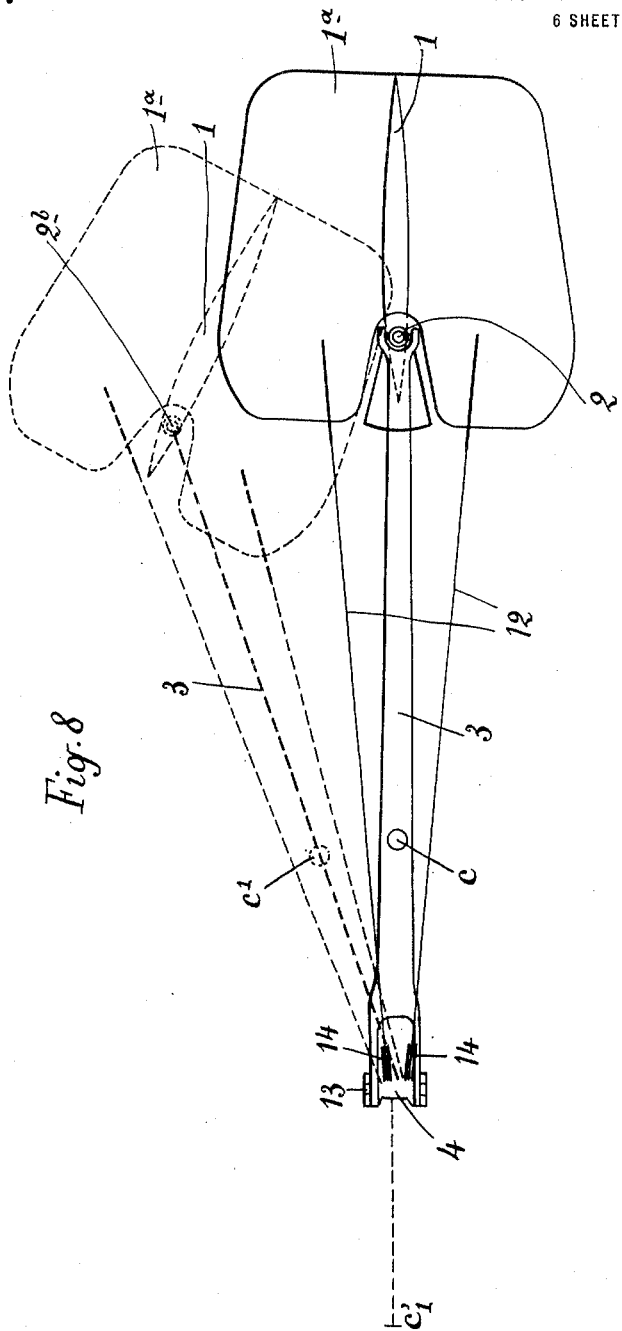

UNITED STATES PATENT OFFICE.

JEAN ALFRED LATHAM, OF LE HAVRE, FRANCE.

CONTROLLING DEVICE FOR AIRSHIPS.

1,366,917.  Specification of Letters Patent.  Patented Feb. 1, 1921.

Application filed November 13, 1919. Serial No. 337,873.

*To all whom it may concern:*

Be it known that I, JEAN ALFRED LATHAM, a citizen of the Republic of France, residing in Le Havre Seine-Inférieure, France, have invented certain new and useful Improvements in Controlling Devices for Airships, of which the following is a specification.

The aeroplanes of large size, the use of which tends actually to become more and more general, require for their handling directing surfaces of great extent, either rudders or movable flaps at the ends of the planes, the displacement of which necessitates very strong controlling gears and calls for considerable exertion from the pilots, the directing gear, hand wheel or other operating means, being in fact restricted to reasonable dimensions and being intended only to perform movements of relatively small amplitude. One has already tried to obviate this by the use of operating relays intended to reduce the muscular effort needed for handling the aeroplane or airship, but these are generally of very delicate operation, and the slightest defect or delay in operation is a source of very serious danger for the aeroplane, so that the use of these apparatus cannot become general.

The present invention has for its purpose to obviate these drawbacks and to allow the control of a large size aeroplane with the same ease and without more exertion than that of small aeroplanes with one or two passengers.

It is known, as a matter of fact, that a rotating surface placed in a fluid possessing a relative velocity with respect to this surface, and to which one gives an oblique direction with respect to the direction of motion of this fluid, tends to adjust itself automatically so as to offer to the fluid a minimum section. It is this property of automatic adjustment which is made use of according to the present method in order to produce the control of the aeroplane's steering means.

To this end, the method which is the object of the present invention consists essentially in arranging on the aeroplane an auxiliary rotating surface, supported by a frame free to take any required position and to adjust itself either about an axis or about one point, and in connecting directly to this frame the rods controlling the directing surfaces of the aeroplane, the displacement of which it is sought to obtain.

It is then understood that the mere control of the rotation of the auxiliary surface on its own axis will automatically produce the displacement or adjustment in direction of the frame carrying this surface under the influence of the external fluid, so that the frame, acting on the rods or cables controlling the directing planes of the aeroplane will in its turn cause automatically a corresponding displacement of these planes.

It goes without saying that the system just described above can be applied to the control of the directing surfaces of any aeroplane, or dirigible, or of any other kind of airship.

Figure 2:
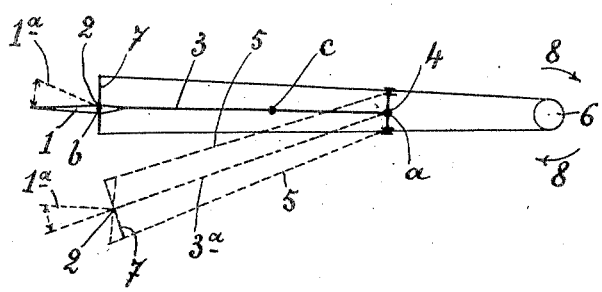

The principle of the present method is shown diagrammatically in Figures 1 and 2 of the appended drawings, which are respectively a perspective side view and a plan.

Figs. 3 and 4 show respectively a side view and a plan of the arrangement adopted when the apparatus comprises but one auxiliary vertical surface for the control of the direction of flight.

Figs. 5, 6 and 7, 8 are similar views, respectively, to Figs. 3 and 4, representing the apparatus when provided with two auxiliary surfaces, one vertical and one horizontal, for the combined control of the direction and of the altitude of flight. In Figs. 5 and 6, the displacement of the system of the auxiliary planes, in the vertical direction only, is shown by dotted lines, while, in Figs. 7 and 8, the displacement of these planes, in both the vertical and the lateral direction, is shown by dotted lines.

Finally, Fig. 9 is a diagrammatical view, explaining the displacement in space of the system of auxiliary planes.

In these figures, 1 represents the auxiliary surface, which can rotate about an axis 2 carried by a frame 3, itself capable of freely rotating about an axis 4. Cables 5 operated by the ordinary operating hand wheel 6, and acting upon a double lever integral with the plane 1, allow of the rotation of this plane at will about its axis 2. If one operates the wheel in the direction indicated by the arrow 8, the surface 1 will take the position indicated in 1ª in Fig. 2; and owing to the action of the wind, the direction of which is indicated by the arrow $g$, the whole of the frame 3 shall rotate about the axis 4, as shown in 3ª on Fig. 2, so that the panel, then in 1ª, will then be directed according to this same wind direction.

The available force of the system being a function of the surface of the panel 1, the latter can be calculated so as to produce the desired effort. Besides, in order to reduce the force necessary to effectuate the rotation of the plane 1 about its axis 2, one shall use preferably a balanced plane such as the one illustrated. The amplitude of the motion necessary to steer an aeroplane being relatively small—10° about—the point where the controlling rods or cables are fastened can be situated between the points $a$ and $b$ of the frame 3, at a distance from $a$ which will be the greater or the lesser the greater or the lesser the amplitude of the motion given to the steering planes themselves. If $c$ be the point where the controlling rods or cables are fastened, the action produced at this point $c$ will be that exerted by the surface 1, multiplied by the ratio $\frac{ab}{ac}$, and this will allow the use of a relatively small auxiliary surface.

If one replaces the axes of rotation 4 and 2 by universal joints of the Cardan type mounted so as to be parallel to one another, and if one at the same time substitutes for the surface 1 two planes perpendicular to one another, and such that, for a position corresponding to no effort the joint replacing the axis 4 is situated upon the line of intersection of these two planes, one will obtain in this manner two displacements of the adjustable frame with respect to two rectangular axes, displacements which may be either independent one from the other, or combined to produce a compound movement. This disposition will be susceptible of being advantageously adapted to the control of the steering planes of an aeroplane by means of a single operating handle such as a unique lever which will control in this manner simultaneously the lateral and the longitudinal stability. It will be sufficient in this case to connect directly to the frame 3 of the two auxiliary planes, the controlling rods or cables of both the steering and stabilizing longitudinal and lateral surfaces.

One manner of carrying out the method which is the object of this invention has been illustrated in Figs. 3 to 9 of the appended drawings.

On considering the arrangement illustrated in Figs. 3 and 4, it is seen that the axis 4 of the frame 3 upon which is pivoted the auxiliary surface 1 passes freely through the wing 10 of the aeroplane, and is provided at its lower end with a controlling lever 11, the length of which is calculated according to the effort to be exerted on the steering surface, the operating rods or cables of which are connected to the end $c$ of this lever. Cables 12, passing through the aeroplane's wing within the hollow axle 4 at the lower end of which they issue, and guided by suitable pulleys, control the rotation of the panel 1 about its own axis.

In Figs. 3 and 4, the position assumed by the system owing to a lateral displacement of the frame 3, caused by a preliminary rotation of the plane 1 is shown in dotted lines. The axis of the plane 1 is then in $2^a$ and the point of action of the control of the steering surface has moved to $c'$.

In the arrangement shown in Figs. 5 to 8 there are two auxiliary planes, 1 and $1^a$, perpendicular to one another and connected with the frame 3 by a universal joint 2 on the Cardan principle, which allows of the trimming of the system of the planes in two mutually perpendicular directions. The frame 3 is itself jointed at 13 upon the axis 4, which said axis passes freely through the wing 10 and carries on its lower end the controlling lever 11 of the steering operating gear, the controlling rods or cables of which are connected to the end $c$ of this lever. The cables 12 controlling the rotation of the system of the auxiliary panels 1 and $1^a$ pass on guiding pulleys 14, through the hollow axle 4, to emerge at the lower end of the axle as before. The frame 3 is connected, by means of a system of connecting rods 15 passing freely through the wing 10, to a lever 16 made in two pieces, the two parts of which are united together by a joint on the Cardan principle, one of the axes of which—the horizontal axis $17^a$,—is also adapted to act as a fixed support to the pivot of the lever 16. At the free end $c'$ of this lever 16 are connected the rods or cables of the altitude control. The lengths of the effective arms of the levers 11 and 16 are naturally calculated in such a manner as to exert the required effort. In Figs. 5 and 6, one has shown with dotted lines the position taken by the system owing to a displacement of the auxiliary surfaces 1 and $1^a$ and of their frame 3 in the vertical plane, the pivot 2 of these surfaces occupying then the position $2^a$, and the point of action $c'$ of the controlling rods or cables of the altitude control taking the position $c_1'$, while the point of action $c$ of the controlling rods or cables of the steering has not altered in position.

In Figs. 7 and 8 one has indicated, again in dotted lines, the position of the system caused by a compound displacement of the movable system that is, a displacement according to two planes, vertical and horizontal. The pivot of the auxiliary surfaces takes then the position $2^b$, the point of action $c$ of the steering controlling rods or cables comes in $c^1$, and the point of action $c'$ of the altitude controlling rods or cables comes in $c_1'$. As one can see on the diagram of Fig. 9, the compound displacement of the pivot 2 along the line $2-2^b$ is (Figs. 7 and 8) nothing else but the resultant of two displacements of this point, one being a vertical displacement along 2—2$^a$, (Figs. 5 and 6) and the other being a horizontal displacement along 2$^a$—2$^b$.

It is therefore understood that, in one or the other of the dispositions described above as examples, the simple rotation of the single auxiliary surface or of the compound auxiliary surfaces about their pivot, rotation which requires from the pilot but a small effort, will produce the automatic setting of the movable structure along the direction of movement of the surrounding fluid and, therefore, a corresponding automatic displacement of the controlling plane levers in the direction required for the suitable operation of the controlling planes.

In the case of the application of the method to an aeroplane, one can mount the movable structure or structures on one of the sustaining planes of the machine, either on the axis of the latter, or symmetrically on either side of the said axis, making use of two similar systems of auxiliary planes.

Having thus described my invention, I declare that what I claim is:—

1. The combination with an airship of a control lever for the steering planes thereof, said lever comprising a hollow shaft forming a pivotal connection between said lever and a fixed part of said airship, an auxiliary plane pivoted at the free end of said lever, and operating means connected with said auxiliary plane and passing through said hollow shaft whereby the pilot may vary the relative position between said auxiliary plane and said lever.

2. The combination with an airplane of a control lever for the steering planes thereof, said lever comprising two arms and a connecting hollow shaft passing through and forming a pivotal connection with one of the fixed planes of said airplane, one of said arms lying above and one below said fixed plane, an auxiliary plane pivoted at the free end of said lever, and operating means connected with said auxiliary plane and passing through said hollow shaft whereby the pilot may vary the relative position between said auxiliary plane and said lever, the lower arm of said lever being adapted for connection with the steering gear of said airplane.

3. The combination with an aeroplane of an auxiliary rotating surface, a second auxiliary surface perpendicular to the first and fixed to it, a frame adapted to support these two surfaces, a universal joint on the Cardan principle connecting these two surfaces to the said frame, a second similar joint connecting the frame to the aeroplane, and means controlled by the pilot to rotate the system of the two auxiliary planes in two perpendicular directions with respect to the frame, said frame and connections including parts adapted to be connected with the steering surfaces and with the altitude controlling surfaces respectively of the aeroplane.

In witness whereof I have hereunto signed my name in the presence of two subscribing witnesses.

JEAN ALFRED LATHAM.

Witnesses:
CHAS. P. PRESSLY,
RENÉ BARDY.